United States Patent
Storz et al.

(10) Patent No.: US 7,151,633 B2
(45) Date of Patent: Dec. 19, 2006

(54) SCANNING MICROSCOPE

(75) Inventors: Rafael Storz, Heidelberg (DE); Werner Knebel, Kronau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/903,139

(22) Filed: Jul. 30, 2004

(65) Prior Publication Data

US 2005/0024721 A1 Feb. 3, 2005

(30) Foreign Application Priority Data

Aug. 2, 2003 (DE) ................ 103 35 466

(51) Int. Cl.
*G02B 21/06* (2006.01)
(52) U.S. Cl. ............... 359/385; 359/368; 356/73; 356/318
(58) Field of Classification Search ........... 359/368, 359/385, 389; 356/317, 318, 417, 73; 250/458.1, 250/461.2
See application file for complete search history.

(56) References Cited

U.S. PATENT DOCUMENTS

| 5,886,784 | A | | 3/1999 | Engelhardt | 356/326 |
|---|---|---|---|---|---|
| 5,896,223 | A | * | 4/1999 | Tigliev et al. | 359/388 |
| 5,936,728 | A | * | 8/1999 | Bouzid | 356/318 |
| 6,388,807 | B1 | * | 5/2002 | Knebel et al. | 359/368 |
| 6,461,054 | B1 | * | 10/2002 | Iwase | 385/73 |
| 6,474,815 | B1 | * | 11/2002 | Ulbers et al. | 351/214 |
| 6,496,307 | B1 | * | 12/2002 | Engelhardt et al. | 359/389 |
| 6,525,812 | B1 | * | 2/2003 | Hartmann et al. | 356/318 |
| 6,631,226 | B1 | * | 10/2003 | Schoeppe et al. | 385/33 |
| 6,909,542 | B1 | * | 6/2005 | Sasaki | 359/385 |
| 2001/0030800 | A1 | | 10/2001 | Engelhardt et al. | 359/368 |
| 2002/0020800 | A1 | | 2/2002 | Knebel et al. | 250/201.3 |
| 2002/0159144 | A1 | * | 10/2002 | Engelhardt et al. | 359/385 |

FOREIGN PATENT DOCUMENTS

| DE | 4330347 | 3/1995 |
|---|---|---|
| EP | 1 245 987 | 10/2002 |
| WO | WO 92/00540 | 1/2002 |

\* cited by examiner

*Primary Examiner*—Alessandro Amari
(74) *Attorney, Agent, or Firm*—Darby & Darby

(57) ABSTRACT

A detector, arranged in the detection beam path of a scanning microscope, for the detection of detected light proceeding from a sample can be used to detect other than the detected light for example of external optical experiments. The scanning microscope comprises an incoupling apparatus with which light other than the detected light can be coupled into the detection beam path and conveyed to the detector.

18 Claims, 4 Drawing Sheets

SCANNING MICROSCOPE

CROSS REFERENCE TO RELATED APPLICATIONS

This application claims priority to German patent application 103 35 466.2, the entire disclosure of which is hereby incorporated by reference herein.

FIELD OF THE INVENTION

The invention concerns a scanning microscope.

BACKGROUND OF THE INVENTION

In scanning microscopy, a sample is illuminated with a light beam in order to observe the reflected or fluorescent light emitted from the sample. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen via a detection beam path is measured, using a detector, as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, an imaging optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is often coupled in via the beam splitter, which can be embodied, for example, as a neutral beam splitter or a dichroic beam splitter. Neutral beam splitters have the disadvantage that depending on the splitting ratio, a great deal of excitation light or detected light is lost.

The detected light (e.g. fluorescent or reflected light) coming from the specimen travels back through the beam deflection device to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the path of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

For many applications, samples are prepared with several markers, for example several different fluorescent dyes. These dyes can be excited sequentially, for example with illuminating light beams that have different excitation wavelengths.

Complex, high-performance detectors, for example multiband detectors or spectrometers that make possible, for example, simultaneous detection of the detected light proceeding from the sample, are usually used in scanning microscopy. German Unexamined Application DE 43 30 347 A1 discloses an apparatus for the selection and detection of at least two spectral regions of a light beam, having a selection device and a detection device. For reliable simultaneous selection and detection of different spectral regions with high yield and a very simple design, the apparatus is embodied in such a way that the selection device encompasses means for spectral subdivision of the light beam and means on the one hand for blocking out a first spectral region and on the other hand for reflecting at least a portion of the unblocked spectral region, and the detection device encompasses a first detector arranged in the beam path of the blocked-out first spectral region and a second detector arranged in the beam path of the reflected spectral region. A slit diaphragm apparatus having mirror-coated diaphragm blades is preferably provided as the means for blocking out a first spectral region and on the other hand for reflecting at least a portion of the unblocked spectral region. The apparatus is usable in particular as a multi-band detector in a scanning microscope.

SUMMARY OF THE INVENTION

It is an object of the present invention to provide a detector for essentially any kind of optical experiment.

The present invention provides a scanning microscope comprising: a light source for illumination of a sample, a detector arranged in a detection beam path, for the detection of detected light proceeding from the sample, an incoupling apparatus with which light other than the detected light can be coupled into the detection beam path and conveyed to the detector.

The invention has the advantage that the usually very complex and usually very high-performance detectors of a scanning microscope are also usable, in particular, for external optical investigations. The external optical investigations can involve, in particular, experiments that are performed remotely from the scanning microscope, the scanning microscope being "misused" as a detection apparatus.

The scanning microscope preferably contains a multi-band detector or a spectrometer as detector.

In an embodiment of the scanning microscope, a light guide is provided that conveys the light other than the detected light to the incoupling apparatus. An outcoupling optical system is preferably provided for coupling the other light out of the light guide.

In an embodiment, the incoupling apparatus has a plug coupling onto which a light-guiding fiber connector can be placed.

A deflection element is preferably introducible into the detection beam path, which element can be embodied, for example, as a deflection mirror and deflects the other light to the detector. Introduction of the deflection element is preferably performed in motor-controlled fashion.

In an embodiment, the incoupling apparatus has at least one beam trap. This prevents further light differing from the other light, for example detected light from the detection beam path or scattered light, from arriving at the detector. The beam trap is preferably designed so that it can be activated with placement of the light guide onto the plug coupling.

In an embodiment of the scanning microscope, the incoupling apparatus has a preferably automatically operating closure apparatus that, upon removal of the light guide, seals off the scanning microscope in largely light-tight fashion from the outside, and thus in particular prevents, for example, hazardous laser radiation from emerging from the scanning microscope.

In an embodiment, the other light is transmitted light. It thereby becomes possible, for example, simultaneously or sequentially to generate both a fluorescence image and an absorption image of a sample. A "real-color" transmission image can be generated by suitable selection of the parameters. For that purpose, the sample is preferably sequentially illuminated with illuminating light of three different wavelengths, and the three transmission images that are obtained are suitably weighted upon assembly to yield a real-color transmission image. An absorption spectrum can be acquired by illuminating the sample with an entire illumination spectrum, which can be generated e.g. using light sources based on photonic band-gap material. The transmitted light is preferably collimated by a condenser and coupled into the light guide leading to the incoupling apparatus. The lamp housing or mirror housing is also usable as an alternative pick-off position for the transmitted light.

BRIEF DESCRIPTION OF THE DRAWINGS

The subject matter of the invention is schematically depicted in the drawings and will be described below with reference to the Figures, identically functioning components being labeled with the same reference characters. In the drawings.

DETAILED DESCRIPTION OF THE INVENTION

Figure 1:
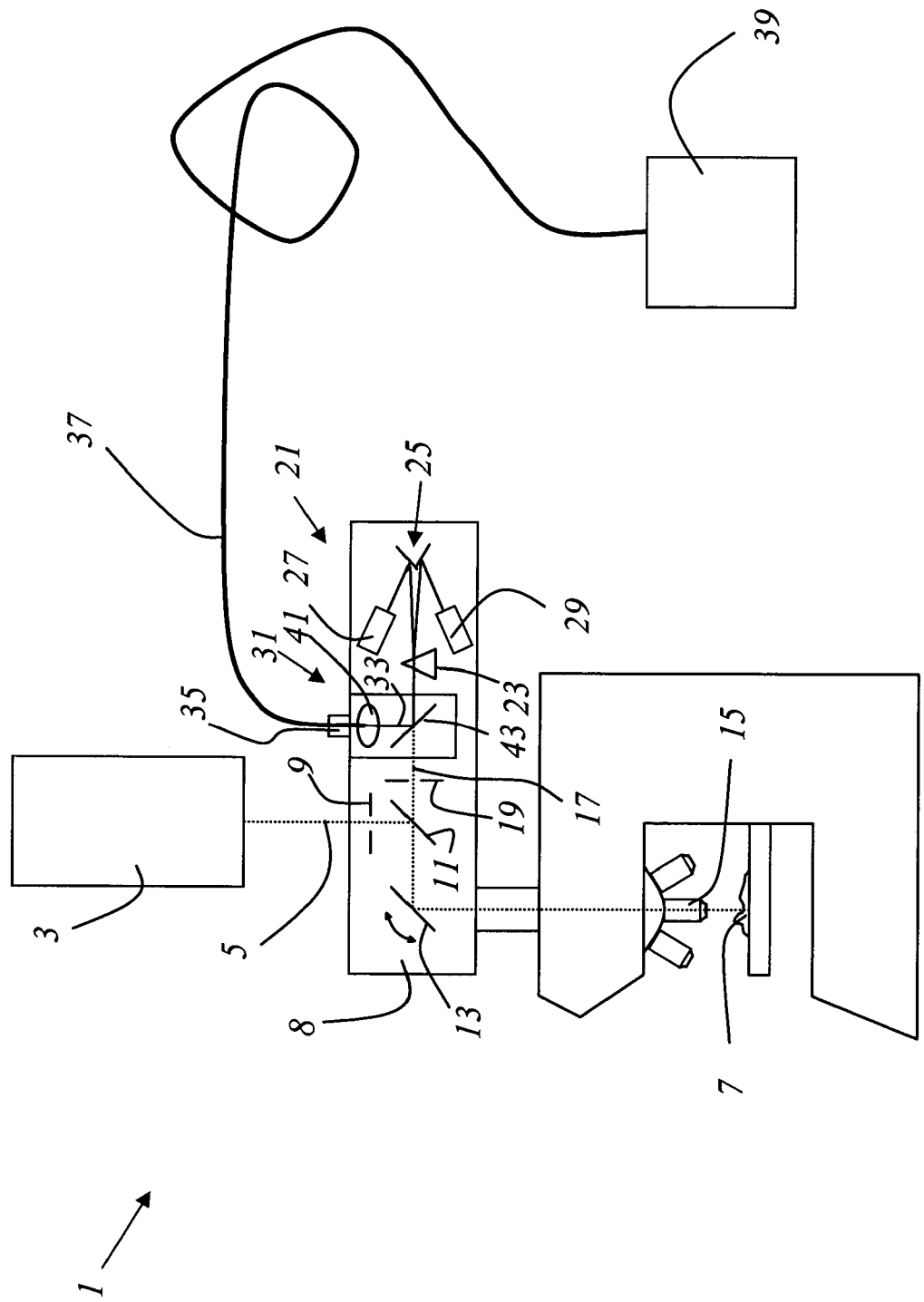
FIG. 1 shows a scanning microscope according to the present invention.

FIG. 1 shows a scanning microscope 1 according to the present invention, having a light source 3 that generates an illuminating light beam 5 for illumination of a sample 7. The scanning microscope is configured as a confocal scanning microscope. For conventional operation, illuminating light beam 5 is coupled into scanning head 8, where it passes through illumination pinhole 9 and then travels to a main beam splitter 11, which reflects illuminating light beam 5 to a gimbal-mounted scanning mirror 13. Gimbal-mounted scanning mirror 13 guides illuminating light beam 5 through the tube and scanning optical systems (not shown) and through microscope objective 15, over or through sample 7. Detected light 17 proceeding from the sample travels on the reverse light path through microscope objective 15, through the scanning and tube optical systems (not shown), and via gimbal-mounted scanning mirror 13 back to beam splitter 11, passes through the latter and detection pinhole 19 that follows it, and finally reaches detector 21. In this scanning microscope 1, detector 21 is embodied as a multi-band detector. It contains a dispersive element 23 that is configured as a prism and that spatially spectrally divides detected light 17. Spectrally spatially divided detected light 17 is separated by a mirror arrangement 25 into two spectral regions and conveyed to two different individual detectors 27, 29 that are each configured as a photomultiplier.

An incoupling apparatus 31, with which light 33 other than detected light 17 can be coupled into the detection beam path and conveyed to detector 21, can be introduced into the detection beam path. The incoupling apparatus encompasses a plug coupling 35 onto which is placed a light guide 37, equipped with a connector, that transports other light 33 from an external experiment 39 to incoupling apparatus 31. Incoupling apparatus 31 contains an outcoupling optical system 41 for coupling the other light out of light guide 37, and a mirror 43 that directs the other light onto the optical axis of the detection beam path.

Figure 2:
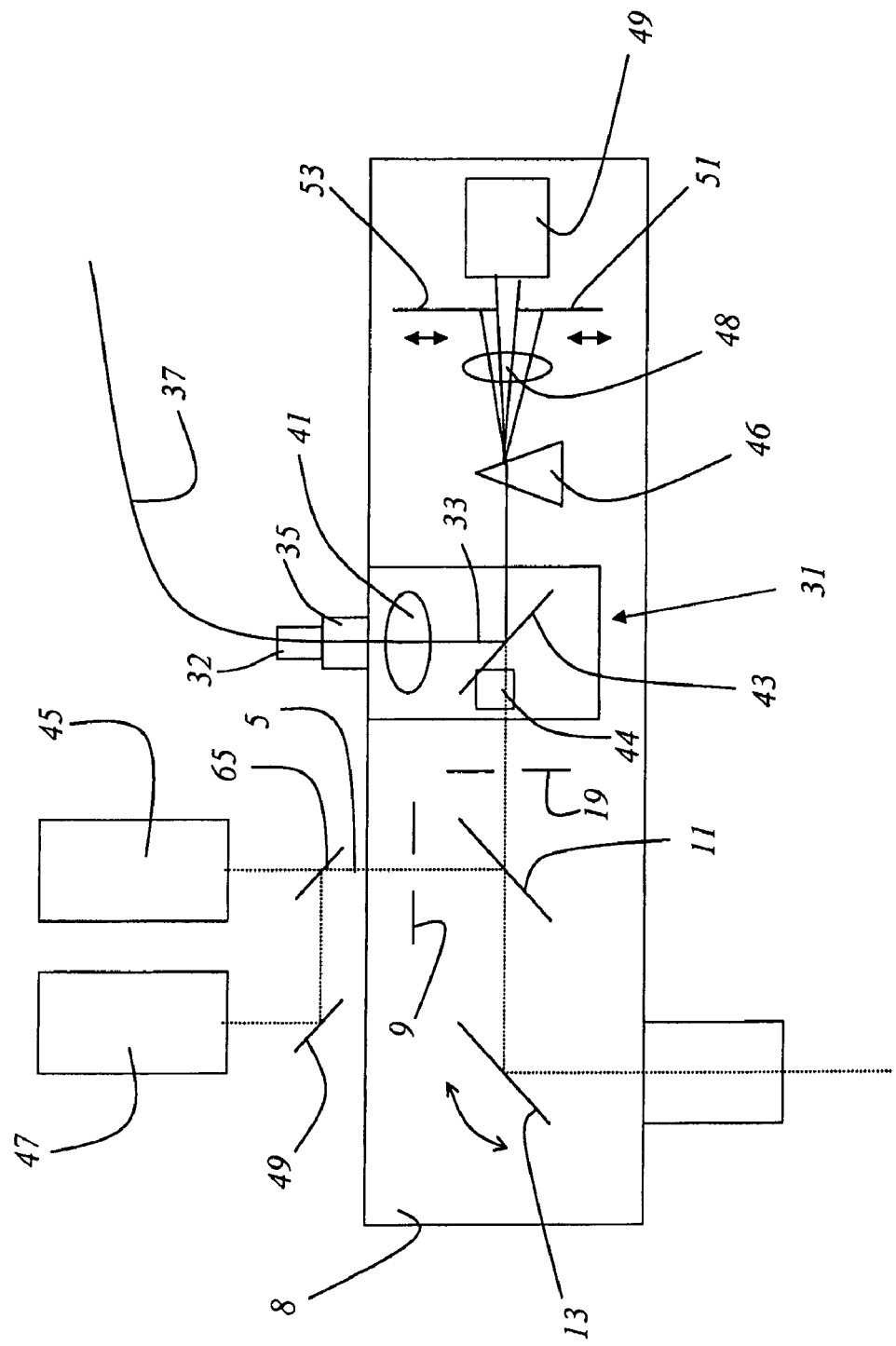
FIG. 2 shows a scanning head with an incoupling apparatus.

FIG. 2 shows scanning head 8 of another confocal scanning microscope according to the present invention, in which two semiconductor lasers 45, 47 are provided as the light source. The light of the semiconductor lasers is combined by means of a deflection mirror 49 and a beam combiner 65 into an illuminating light beam 5, and then coupled into scanning head 8 as already described with reference to FIG. 1. Other light 33 is transported via light guide 37 to incoupling apparatus 31, collimated there by means of outcoupling optical system 41, and directed via deflection mirror 43 to prism 46, which spatially spectrally divides other light 33. Motor 44 is provided for moving mirror 43. The spatially spectrally divided other light is focused by means of field lens 48 into a focus line, in which two displaceably arranged diaphragm blades cut out the spectral component of the other light that is to be detected and cause it to arrive at individual detector 49. By displacing diaphragm blades 51, 53 it is possible to adjust not only the position of the spectral region to be detected but also the width of the spectral region to be detected. Closure apparatus 32 is provided for automatically closing off the incoupling apparatus from the outside in largely light-tight fashion when light guide 37 is removed.

Figure 3:
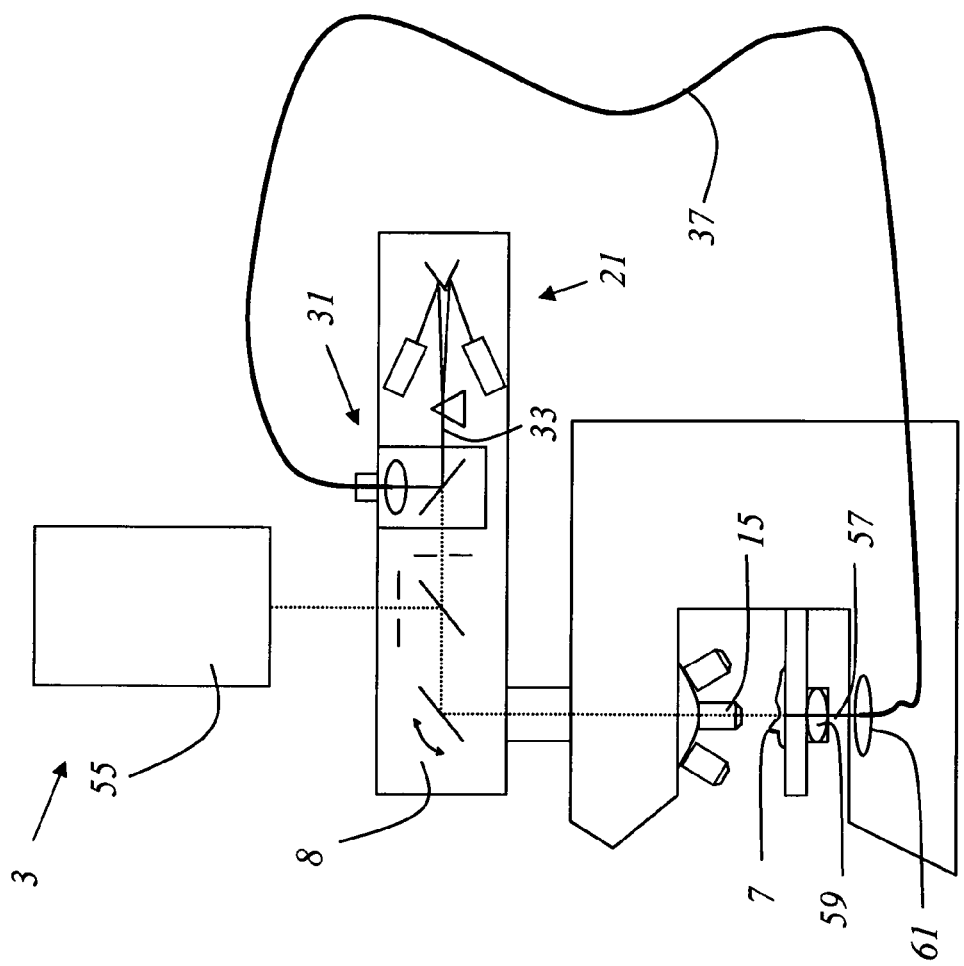
FIG. 3 shows another scanning microscope.

FIG. 3 shows a confocal scanning microscope according to the present invention in which other light 33, constituting transmitted light, is transported to the incoupling apparatus 31 using light guide 37. In this scanning microscope, light source 3 is embodied as a continuum laser 55 that contains photonic band-gap material. The scanning microscope is suitable, in particular, for acquiring an absorption spectrum of sample 7. Transmitted light 57 is collimated by a condenser 59 and coupled into light guide 37 by means of incoupling optical system 61.

Figure 4:
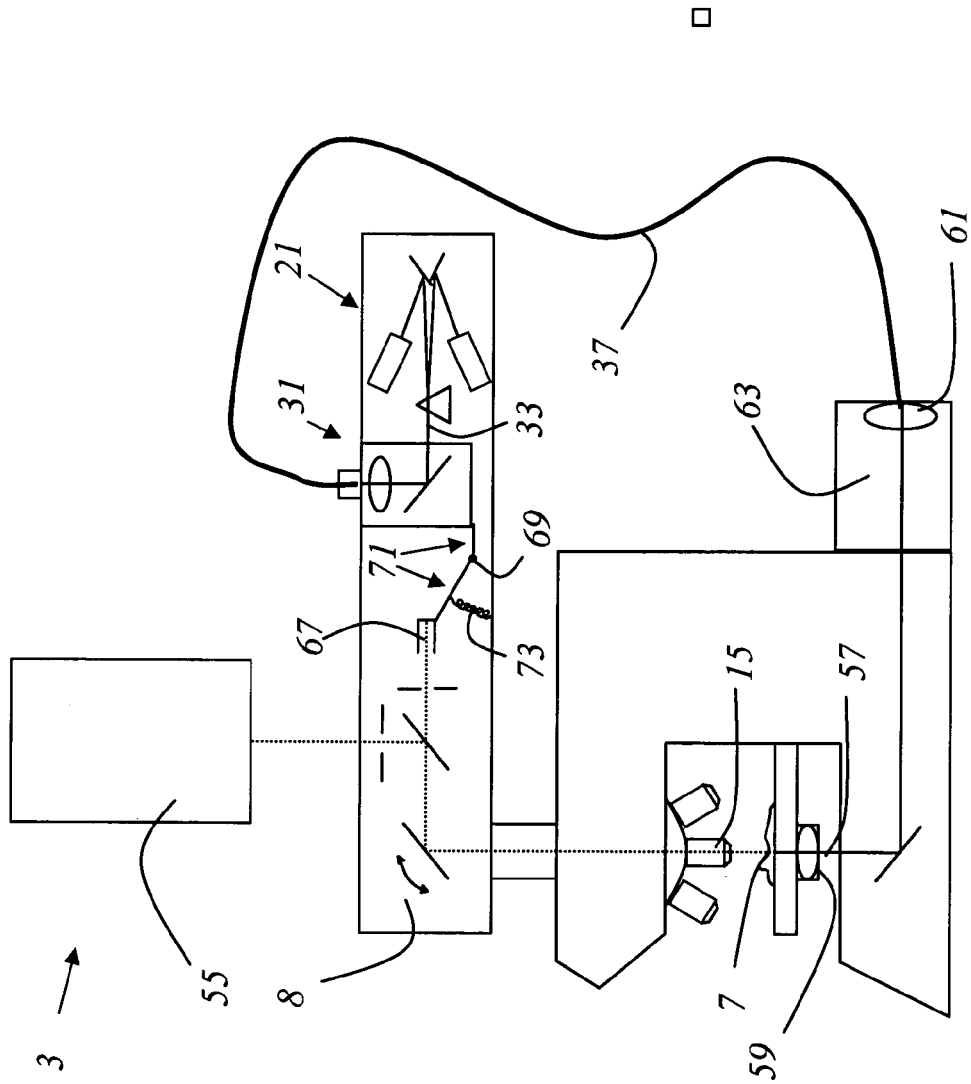
FIG. 4 shows a further scanning microscope.

FIG. 4 shows a further confocal scanning microscope according to the present invention in which transmitted light 57 is used as other light 33. In this embodiment, lamp housing 63, which contains incoupling optical system 61 for coupling the transmitted light into light guide 37, is selected as the pick-off position for transmitted light 57. In this variant, a beam trap 67 is provided. This prevents further light differing from transmitted light 57, for example detected light 17 from the detected beam path or scattered light, from reaching detector 21.

Upon introduction of incoupling apparatus 31, beam trap 67 is brought into the working position by way of a lever apparatus 71 rotating about a rotation axis 69. This tensions a tension spring 73 that pulls the beam trap out of the beam path upon removal of incoupling apparatus 31.

The invention has been described with reference to a particular exemplary embodiment. It is self-evident, however, that changes and modifications can be made without thereby leaving the range of protection of the claims below.

What is claimed is:

1. A scanning microscope comprising:
   a light source for illumination of a sample
   a detector arranged in a detection beam path, for the detection of detected light proceeding from the sample, an incoupling apparatus with which light other than the detected light can be coupled into the detection beam path in a direction of the detected light and conveyed to the detector, wherein the incoupling apparatus includes a plug coupling configured to receive a light guide, the light guide being configured to convey the other light.

2. The scanning microscope as defined in claim 1, wherein the detector comprises a multi-band detector.

3. The scanning microscope as defined in claim 1, wherein the detector comprises a spectrometer.

4. The scanning microscope as defined in claim 1, wherein the incoupling apparatus comprises an outcoupling optical system for coupling the other light out of the light guide.

5. The scanning microscope as defined in claim 1, further comprising a closure apparatus which automatically closes off the incoupling apparatus from the outside in largely light-tight fashion when the light guide is removed.

6. The scanning microscope as defined in claim 1, further comprising a beam trap.

7. The scanning microscope as defined in claim 1, wherein the incoupling apparatus includes a motorized mirror configured to direct the other light into the detection beam path.

8. The scanning microscope as defined in claim 1, further comprising a deflection element which is introducible into the detection beam path and which deflects the other light to the detector.

9. The scanning microscope as defined in claim 1, wherein the other light comprises transmitted light.

10. The scanning microscope as defined in claim 1, wherein the scanning microscope is a confocal scanning microscope.

11. A confocal scanning microscope comprising:

a light source for illumination of a sample, a detector arranged in a detection beam path, for the detection of detected light proceeding from the sample, an incoupling apparatus with which light other than the detected light can be coupled into the detection beam path in a direction of the detected light and conveyed to the detector, wherein the incoupling apparatus includes a plug coupling configured to receive a light guide, the light guide being configured to convey the other light.

12. A scanning microscope comprising:

a light source for illumination of a sample;

a detector arranged in a detection beam path, for the detection of detected light proceeding from the sample; and an incoupling apparatus with which light from a second light source can be coupled into the detection beam path in a direction of the detected light and conveyed to the detector, the light from the second light source being independent of the light source for illumination.

13. The scanning microscope as defined in claim 12, wherein the detector comprises a multi-band detector.

14. The scanning microscope as defined in claim 12, wherein the detector comprises a spectrometer.

15. The scanning microscope as defined in claim 12, further comprising a light guide that conveys the light from the second light source to the incoupling apparatus.

16. The scanning microscope as defined in claim 15, wherein the incoupling apparatus comprises an outcoupling optical system for coupling the light from the second light source out of the light guide.

17. The scanning microscope as defined in claim 15, further comprising a closure apparatus which automatically closes off the incoupling apparatus from the outside in largely light-tight fashion when the light guide is removed.

18. The scanning microscope as defined in claim 12, further comprising a beam trap.

* * * * *